United States Patent
Kim et al.

(10) Patent No.: US 12,195,104 B2
(45) Date of Patent: Jan. 14, 2025

(54) STEERING APPARATUS

(71) Applicant: HL MANDO CORPORATION, Pyeongtaek-si (KR)

(72) Inventors: Taesik Kim, Yongin-si (KR); Eulgo Jung, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 18/237,190

(22) Filed: Aug. 23, 2023

(65) Prior Publication Data

US 2024/0199109 A1 Jun. 20, 2024

(30) Foreign Application Priority Data

Dec. 14, 2022 (KR) .................... 10-2022-0174868

(51) Int. Cl.
*B62D 5/00* (2006.01)

(52) U.S. Cl.
CPC .................... *B62D 5/006* (2013.01)

(58) Field of Classification Search
CPC ...................................... B62D 5/006
See application file for complete search history.

(56) References Cited

U.S. PATENT DOCUMENTS

| 8,006,799 B2 * | 8/2011 | Yamanaka | B62D 5/006 180/444 |
| 11,945,519 B2 * | 4/2024 | Kogure | B62D 5/001 |
| 2021/0332890 A1 * | 10/2021 | Wilson-Jones | F16H 25/2015 |
| 2022/0111885 A1 * | 4/2022 | Raither | B62D 6/008 |

* cited by examiner

*Primary Examiner* — Faye M Fleming
(74) *Attorney, Agent, or Firm* — Hauptman Ham, LLP

(57) ABSTRACT

An embodiment of the present disclosure relates to a steering apparatus including a steering wheel which is manipulated by a driver of a vehicle and a steering column which is turned by the steering wheel. The steering apparatus may include a rotation restraint mechanism which is able to restrict the rotation of the steering column by providing mechanical feedback to the steering column.

17 Claims, 6 Drawing Sheets

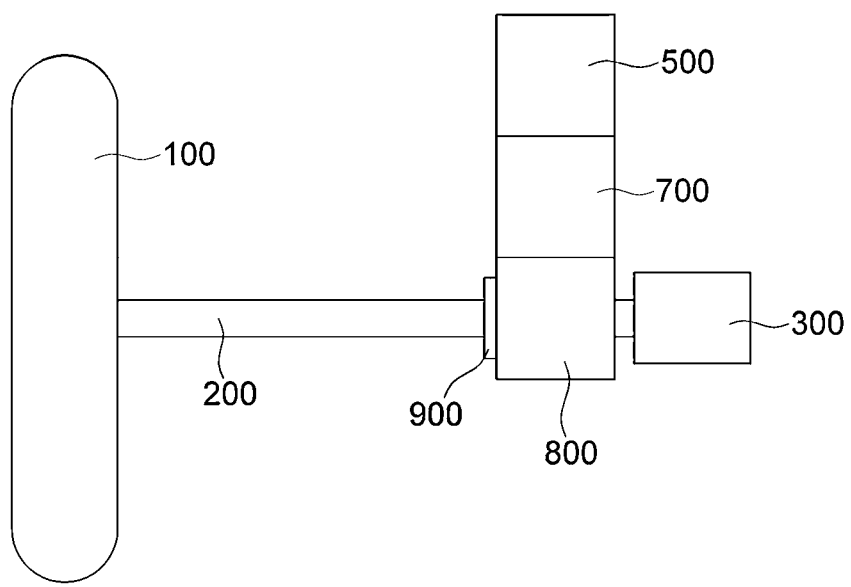
[Fig.1.]

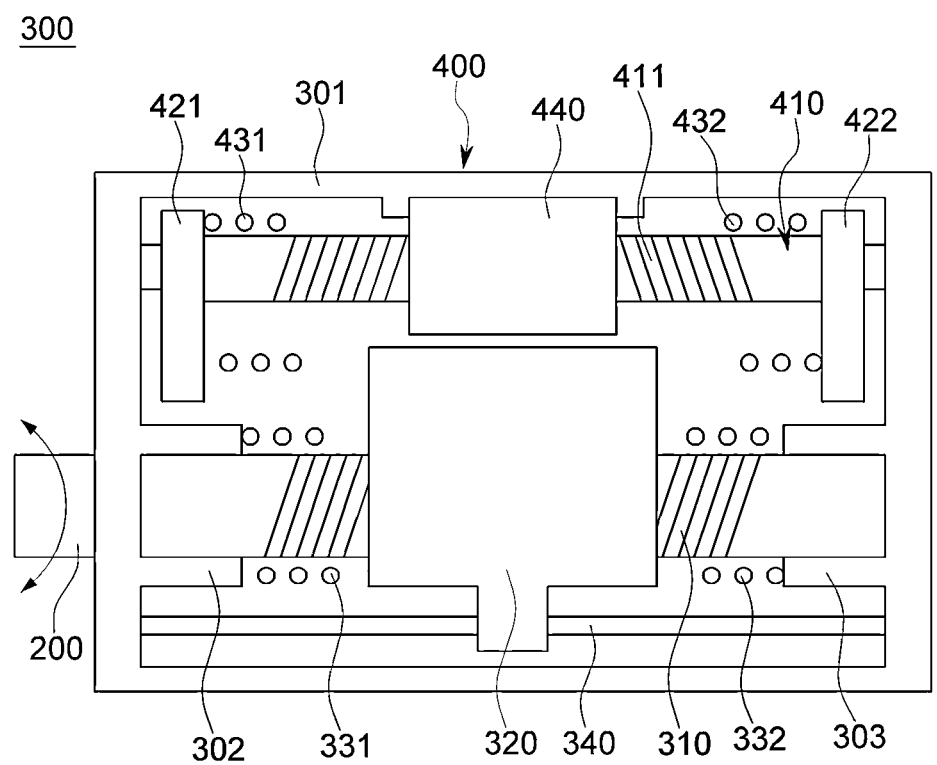
[Fig.2.]

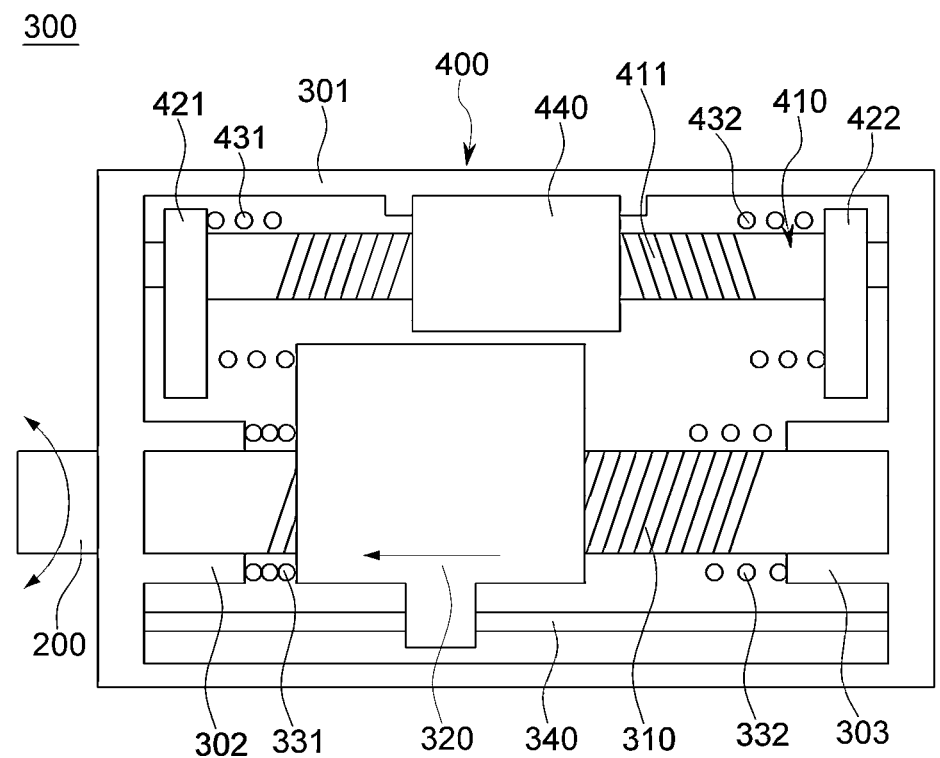
[Fig.3.]

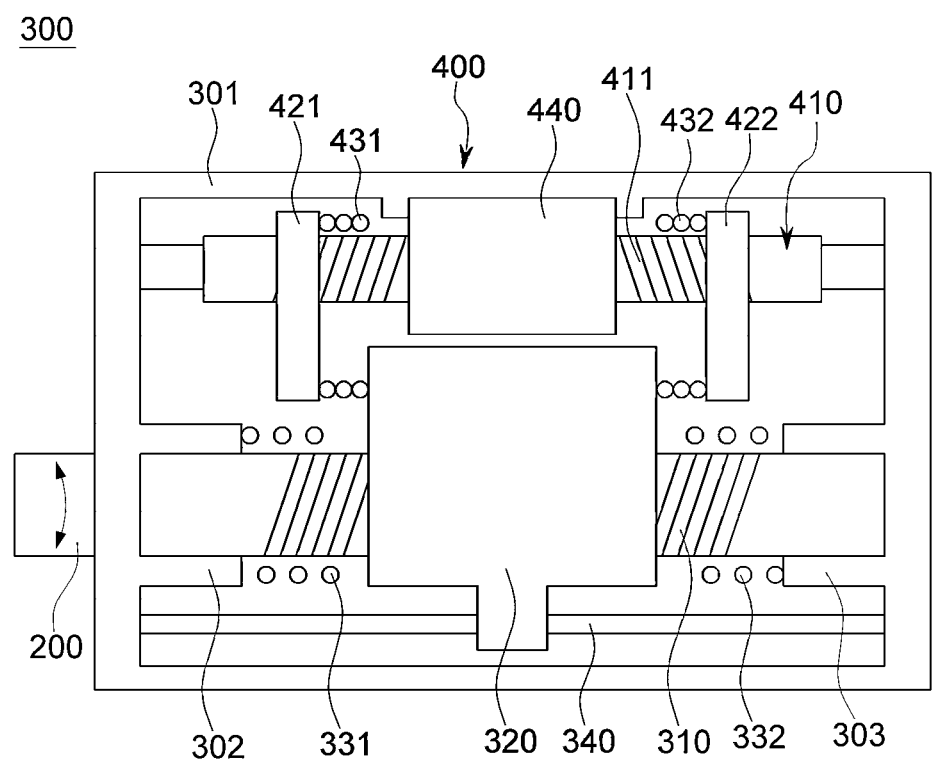
[Fig.4.]

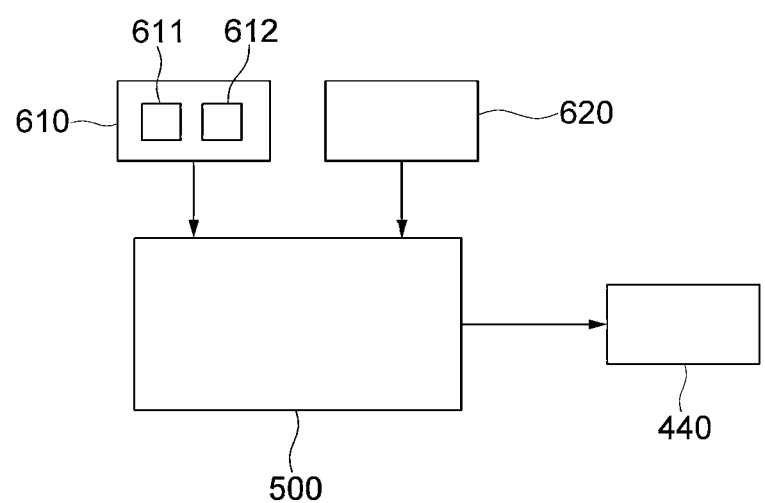
[Fig.5.]

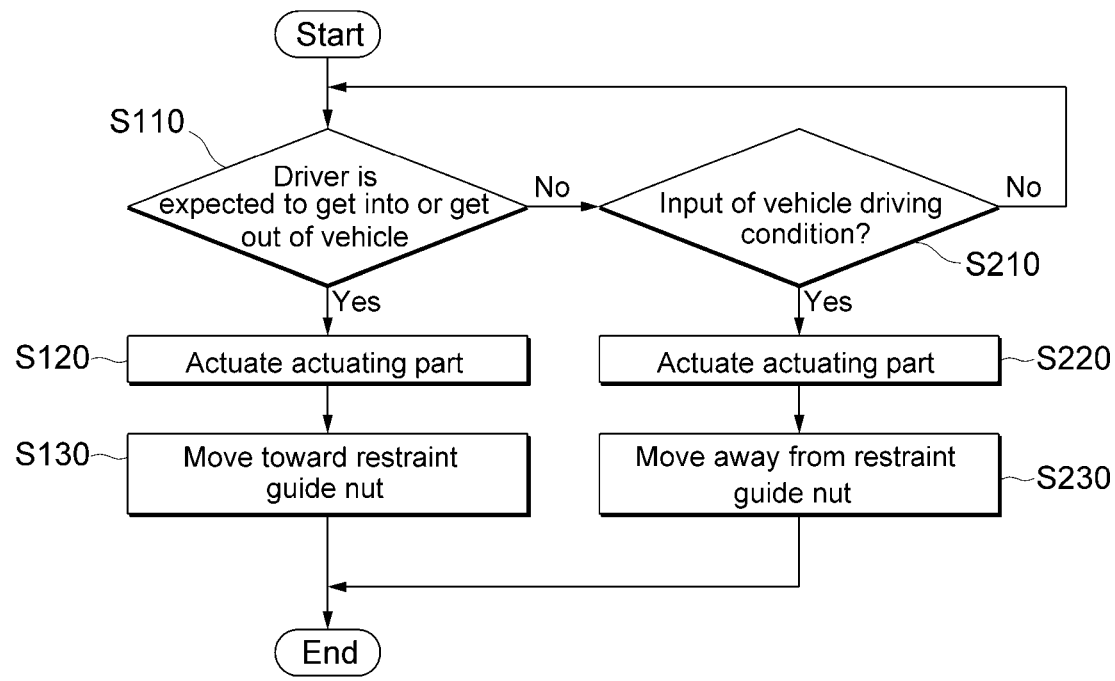
[Fig.6.]

STEERING APPARATUS

CROSS REFERENCE TO RELATED APPLICATION

The present application claims priority to Korean Patent Application No. 10-2022-0174868, filed Dec. 14, 2022, the entire contents of which is incorporated herein for all purposes by this reference.

TECHNICAL FIELD

An embodiment of the present disclosure relates to a steering apparatus, and more particularly, to a steering apparatus for a vehicle that can be manipulated by a driver.

BACKGROUND

In general, a steer-by-wire type steering apparatus includes a steering feedback actuator connected to a steering wheel to provide the driver with feedback from the steering wheel and a road wheel actuator electrically connected to the steering feedback actuator to move the wheels.

The steering feedback actuator and the road wheel actuator are not mechanically connected but are electrically connected to control the steering of the vehicle.

In this case, the steering feedback actuator needs to be constantly powered. Another problem is that the steering feedback actuator requires a large-capacity actuating part in order to provide feedback from the steering wheel.

SUMMARY

An embodiment of the present disclosure provides a steering apparatus that, if the driver is expected to get into or get out of the vehicle when the vehicle is not started, prevents the driver from getting injured due to idling of the steering wheel as the driver gets in or out of the vehicle while holding the steering wheel, by restricting the range of rotation of a steering column.

According to an embodiment of the present disclosure, there is provided a steering apparatus including a steering wheel which is manipulated by a driver of a vehicle and a steering column which is turned by the steering wheel, the steering apparatus including a rotation restraint mechanism which is able to restrict the rotation of the steering column by providing mechanical feedback to the steering column.

Furthermore, the rotation restraint mechanism may include a main lead screw formed in one region of the steering column, a nut that is movable along the main lead screw, and a main elastic member that forms feedback when the nut moves.

Furthermore, the rotation restraint mechanism may further include a nut movement range adjusting part capable of adjusting the range of movement of the nut.

Furthermore, the nut movement range adjusting part may include: a supporting shaft spaced apart from the steering column: an adjusting guide supported on the supporting shaft and being movable toward the nut: and an actuating part that provides power so as to move the adjusting guide.

Furthermore, the adjusting guide may include: a first guide member supported on the supporting shaft and disposed on one side of the nut: and a second guide member supported on the supporting shaft and disposed on the other side of the nut.

Furthermore, the nut movement range adjusting part may include: a first auxiliary elastic member disposed between one side of the nut and the first guide member; and a second auxiliary elastic member disposed between the other side of the nut and the second guide member.

Furthermore, the above-described steering apparatus may further include a control part that, if the driver is expected to get into or get out of the vehicle, actuates the nut movement range adjusting part so as to restrict the range of movement of the nut.

Furthermore, the steering apparatus may further include a control part that, if a vehicle driving condition is inputted, actuates the nut movement range adjusting part such that the range of movement of the nut is not restricted.

Furthermore, the above-described steering apparatus may further include a control part that, if the driver is expected to get into or get out of the vehicle, actuates the actuating part such that the first guide member and the second guide member move in a direction toward each other.

According to another embodiment of the present disclosure, there is provided a steering apparatus including a steering wheel which is manipulated by a driver of a vehicle and a steering column which is turned by the steering wheel, the steering apparatus including a rotation restraint mechanism which, based on whether a vehicle driving condition is inputted or not, is able to restrict the rotation of the steering column by providing mechanical feedback with respect to the rotation of the steering column as the steering wheel is turned.

Furthermore, the rotation restraint mechanism may include: a main lead screw formed in one region of the steering column; a nut that is movable along the main lead screw; a first main elastic member which forms feedback when the nut moves in one direction: a second main elastic member which forms feedback when the nut moves in the other direction: a first restraint member spaced apart from the nut, with the first main elastic member in between, for restricting the position of the first main elastic member; and a second restraint member spaced apart from the nut, with the second main elastic member in between, for restricting the position of the second main elastic member.

Furthermore, the rotation restraint mechanism may include: a first guide member configured to move toward the nut and capable of adjusting the range of movement of the nut: and a second guide member spaced apart from the first guide member, with the nut in between, configured to be movable toward the nut, and capable of adjusting the range of movement of the nut.

Furthermore, the rotation restraint mechanism may further include: a first auxiliary elastic member which is compressed and forms feedback as the first guide member moves toward the nut; and a second auxiliary elastic member which is compressed and forms feedback as the second guide member moves toward the nut.

Furthermore, if a vehicle driving condition is inputted, the rotation restraint mechanism may cause the first guide member and the second guide member to move in a direction away from the nut.

Furthermore, when the first guide member and the second guide member move in a direction away from the nut, the first guide member and the second guide member may move outside the area where the main lead screw is formed.

According to yet another embodiment of the present disclosure, there is provided a steering apparatus including a steering wheel which is manipulated by a driver of a vehicle and a steering column which is turned by the steering wheel, the steering apparatus including a rotation restraint mechanism which, if the driver is expected to get out of the vehicle, is able to restrict the rotation of the steering column by providing a larger amount of mechanical feedback with respect to the rotation of the steering column as the steering wheel is turned, compared to when the vehicle is driving.

Furthermore, the rotation restraint mechanism may include: a main lead screw formed in one region of the steering column; a nut that is movable along the main lead screw; a main elastic member that, if the vehicle is driving, forms feedback when the nut moves; and an adjusting guide that is movable along the supporting shaft: and an auxiliary elastic member that, if the driver is expected to get into or get out of the vehicle, forms feedback when the nut moves.

Furthermore, if the driver is expected to get out of the vehicle, the auxiliary elastic member may be compressed to a large extent compared to the main elastic member.

Furthermore, if the driver is expected to get out of the vehicle, the area in which the nut is movable on the main lead screw may be small compared to when the vehicle is driving. Furthermore, one side of the adjusting guide may be supported on the supporting shaft, and the other side of the adjusting guide may be configured to extend toward the steering column.

According to embodiments of the present disclosure, if the driver is expected to get into or get out of the vehicle when the vehicle is not started, a steering apparatus is able to prevent the driver from getting injured due to idling of the steering wheel as the driver gets in or out of the vehicle while holding the steering wheel, by restricting the range of rotation of a steering column.

BRIEF DESCRIPTION OF THE DRAWINGS

FIG. 1 is a diagram schematically showing a steering apparatus according to an embodiment of the present disclosure.

FIG. 2 is a diagram showing an interior of a rotation restraint mechanism of FIG. 1.

FIGS. 3 and 4 are diagrams showing an operating state of a rotation restraint mechanism.

FIG. 5 is a diagram schematically showing a construction of a steering apparatus according to an embodiment of the present disclosure.

FIG. 6 is a sequential chart showing an operation process of the rotation restraint mechanism.

DETAILED DESCRIPTION

Embodiments of the present disclosure will be described in detail below with reference to the accompanying drawings so that those having ordinary knowledge in the art to which the present disclosure pertains can easily practice the present disclosure. The present disclosure may be implemented in various different forms, and is not limited to the embodiments described herein.

It is noted that the drawings are schematic, and are not necessarily drawn to scale. The relative dimensions and ratios of the components in the drawings may be exaggerated or diminished in size for the sake of clarity and convenience, and such arbitrary dimensions are merely illustrative and are not limitative. Furthermore, the same reference symbol is used for the same structure, element, or part shown in two or more drawings in order to represent similar features.

The embodiments of the present disclosure specifically illustrate ideal embodiments of the present disclosure. As a result, various modifications of illustrations are expected. Accordingly, the embodiments are not limited to the specific forms of illustrated regions, and include, for example, the modifications of shapes resulting from manufacture.

Hereinafter, as illustrated in FIGS. 1 and 5, a steering apparatus 101 according to an embodiment of the present disclosure will be described.

The steering apparatus 101 includes a steering wheel 100 and a steering column 200. Specifically, the steering wheel 100 is manipulated by the driver of the vehicle. The steering column 200 is turned by the steering wheel 100.

The steering apparatus 101 according to an embodiment of the present disclosure is a steer-by-wire type steering apparatus.

As illustrated in FIG. 1, the steering apparatus 101 according to an embodiment of the present disclosure includes a rotation restraint mechanism 300.

The rotation restraint mechanism 300 is able to restrict the rotation of the steering column 200 by providing mechanical feedback to the steering column 200. Specifically, if the steering column 200 is turned by the steering wheel 100, the rotation restrain mechanism 300 may restrict rotation by providing mechanical feedback, such that the steering column 200 is kept from rotating.

Moreover, the steering wheel 100 may be connected to one side of the steering column 200, and the rotation restraint mechanism 300 may be disposed on the other side of the steering column 200 to restrict the rotation of the steering column 200 by providing mechanical feedback.

With this construction, the steering apparatus 101 according to an embodiment of the present disclosure is able to stop the rotation of the steering column 200 by providing mechanical feedback as the steering column 200 rotates. Specifically, the steering apparatus 101 according to an embodiment of the present disclosure is able to restrict the rotation of the steering column 200, not by actuating an electronic device but through mechanical feedback, thereby effectively preventing battery discharging or the consumption of electrical power for the operation of the electronic device.

Accordingly, the steering apparatus 101 according to an embodiment of the present disclosure is able to effectively prevent the driver from getting injured due to idling of the steering wheel 100 by restricting the rotation of the steering column 200 through mechanical feedback.

Furthermore, the rotation restraint mechanism 300 of the steering apparatus 101 according to an embodiment of the present disclosure may include a main lead screw 310, a nut 320, and a main elastic member 330, as illustrated in FIGS. 2 and 3.

The main lead screw 310 may be formed in one region of the steering column 200. Specifically, the main lead screw 310 may be threaded in one region on the other side of a shaft of the steering column 200.

The nut 320 may be supported in such a way as to move along the main lead screw 310. Specifically, the nut 320 may be coupled in such a way as to move along the length direction of the steering column 200 when the steering column 200 rotates.

The main elastic member 330 may form feedback when the nut 320 moves. Also, as illustrated in FIG. 3, the main elastic member 330 may form feedback of rotation of the steering column 200 as the nut 320 is compressed along the length direction of the steering column 200. That is, the nut 320 is restrained from moving along the length direction of the steering column 20 due to the compression of the main elastic member 330, thereby stopping the rotation of the steering column 200. The main elastic member 330 is compressed as the steering column 200 rotates, and the steering column 200 stops turning once the compression of the main elastic member 330 is completed.

Additionally, the main elastic member 330 may restrict the movement of the nut 320 and form feedback, and therefore may effectively reduce noise even if the movement of the nut 320 is restricted.

Furthermore, the rotation restraint mechanism 300 of the steering apparatus 101 according to an embodiment of the present disclosure may further include a nut movement range adjusting part 400.

The nut movement range adjusting part 400 may adjust the range of movement of the nut 320. Also, the nut movement range adjusting part 400 may adjust the range of movement of the nut 320 along the length direction of the shaft of the steering column 200.

Specifically, the nut 320 may move within the range of the main lead screw 310 formed on the shaft of the steering column 200, but the range of movement in which the nut can be moved along the length direction of the shaft of the steering column 200 may be restricted by the nut movement range adjusting part 400.

Furthermore, the nut movement range adjusting part 400 according to an embodiment of the present disclosure may include a supporting shaft 410, an adjusting guide 420, and an actuating part 440, as illustrated in FIG. 4.

The supporting shaft 410 may be spaced apart from the steering column 200. Also, the supporting shaft 410 may be disposed in a direction parallel to the length direction of the steering column 200. That is, the supporting shaft 410 may be disposed in parallel with the shaft of the steering column 200 and spaced apart from the steering column 200.

Specifically, the rotation restraint mechanism 300 includes a housing 301 forming an outward appearance thereof. At least part of the shaft of the steering column 200 may be inserted into the housing 301. The main lead screw 310 may be formed in one region of the shaft of the steering column 200 which is inserted into the housing 301.

Moreover, the nut 320 and the main elastic member 330, too, may be disposed inside the housing 301.

The supporting shaft 410 may be disposed inside the housing 301 and spaced apart from the shaft of the steering column 200.

The adjusting guide 320 may be moved toward the nut 320. Also, the adjusting guide 320 may be supported on the supporting shaft 410. Specifically, the adjusting guide 420 may be moved in a direction toward the nut 320 or in a direction away from the nut 320. The range of movement of the nut 320 may be adjusted as the adjusting guide 420 moves.

The actuating part 440 may provide power to move the adjusting guide 420. The actuating part 440 may provide power so that the adjusting guide 420 moves toward the nut 320 or moves in a direction away from the nut 320.

The actuating part 440 may change the direction of rotation of the supporting shaft 410 so that the adjusting guide 420 moves in a direction toward the nut 320 or the adjusting guide 420 moves in a direction away from the nut 320.

Furthermore, the adjusting guide 420 according to an embodiment of the present disclosure may include a first guide member 421 and a second guide member 422.

The first guide member 421 may be supported on the supporting shaft 410 and disposed on one side of the nut 320. Specifically, the first guide member 421 may be coupled to the supporting shaft 410 in such a way as to move along the length direction of the supporting shaft 410. Alternatively, the first guide member 421 may be disposed on one side of the nut 320 within the housing 301.

The first guide member 421 may be supported on the supporting shaft 410 and disposed on the other side of the nut 320. Specifically, the second guide member 422 may be coupled to the supporting shaft 410 in such a way as to move along the length direction of the supporting shaft 410. Alternatively, the second guide member 422 may be disposed on the other side of the nut 320 within the housing 301. That is, the first guide member 421 and the second guide member 422 may be spaced apart from each other, with the actuating part 440 in between.

In addition, an auxiliary lead screw 411 may be formed on the supporting shaft 410 of the present disclosure. Once the actuating part 440 rotates the supporting shaft 410, the first guide member 431 and the second guide member 422 to be coupled to the auxiliary lead screw 411 may be moved along the length direction of the supporting shaft 410. Specifically, the auxiliary lead screw 411 formed on the supporting shaft 410 to which the first guide member 421 and the second guide member 422 are coupled may be formed in opposite directions.

That is, the first guide member 421 and the second guide member 422 may be moved together as the supporting shaft 410 rotates.

For example, a plurality of supporting shafts 410 may be disposed and rotated by the actuating part 440.

Furthermore, the nut movement range adjusting part 400 according to the present disclosure may include an auxiliary elastic member 430.

In a case where the movement range adjusting part 400 restricts the movement of the nut 320 to a narrower range, the auxiliary elastic member 430 may be compressed by the nut 320 and provide mechanical feedback.

Furthermore, the nut movement range adjusting part 400 according to an embodiment of the present disclosure may include a first auxiliary elastic member 431 and a second auxiliary elastic member 432.

The first auxiliary elastic member 431 may be disposed between one side of the nut 320 and the first guide member 421. Also, the first auxiliary elastic member 431 may be compressed by the first guide member 421. And, the first auxiliary elastic member 431 may be compressed and provide mechanical feedback as the first guide member 421 moves. That is, the first auxiliary elastic member 431 may be compressed and restrict the range of movement of the nut 430 as the first guide member 421 for adjusting the range of movement of the nut 320 moves.

The second auxiliary elastic member 432 may be disposed between the other side of the nut 320 and the first guide member 421. Also, the second auxiliary elastic member 432 may be compressed by the second guide member 422. And, the second auxiliary elastic member 431 may be compressed and provide mechanical feedback as the second guide member 422 moves. That is, the second auxiliary elastic member 432 may be compressed and restrict the range of movement of the nut 430 as the second guide member 422 for adjusting the range of movement of the nut 320 moves.

The first auxiliary elastic member 431 and the second auxiliary member 432 may be spaced apart from each other, with the actuating part 440 in between.

That is, the first auxiliary elastic member 431 and the second auxiliary member 432 may be compressively deformed and provide mechanical feedback if the range of movement of the nut 320 is restricted.

Moreover, the first guide member 421 and the second guide member 422 according to an embodiment of the present disclosure may be configured to partially extend toward the nut 320.

One side of the first guide member 421 may be supported on the supporting shaft 410, and the other side of the first guide member 421 may be configured to extend toward the steering column 200 in a direction that intersects the length direction of the supporting shaft 410.

That is, the first guide member 421 may restrict the position of the first auxiliary elastic member 431 disposed between the nut 320 and the first guide member 421 so that the first auxiliary elastic member 431 is compressively deformed.

One side of the second guide member 422 may be supported on the supporting shaft 410, and the other side of the second guide member 422 may be configured to extend toward the steering column 200 in a direction that intersects the length direction of the supporting shaft 410.

That is, the second guide member 422 may restrict the position of the second auxiliary elastic member 432 disposed between the nut 320 and the second guide member 422 so that the second auxiliary elastic member 432 is compressively deformed.

In other words, the first guide member 421 and the second guide member 422 may compressively deform the first auxiliary elastic member 431 and the second auxiliary elastic member 432 in a direction toward the nut 320 so that they are compressed.

Accordingly, the range of movement of the nut 320 may be decreased if the first guide member 421 and the second guide member 422 are moved in a direction.

Furthermore, the steering apparatus 101 according to an embodiment of the present disclosure may further include a control part 500, as illustrated in FIG. 5.

The control part 500 may predict whether the driver will get into or get out of the vehicle. Also, the control part 500 may adjust the range of movement of the nut 320 by actuating the nut movement range adjusting part 400.

Specifically, the control part 500 may get information from a driver get-in/get-off prediction detection part 610. The driver get-in/get-out prediction detection part 610 may include a driver get-in prediction condition detection part 611 and a driver get-out prediction condition detection part 612. Accordingly, the control part 500 may predict and determine whether the driver will get into or get out of the vehicle.

The driver get-in/get-out prediction condition detection part 611 may detect whether the driver will get into the vehicle.

For example, the driver get-in/get-out prediction condition detection part 611 may detect one or more of whether the door is unlocked or not, whether the door is open or not, whether the vehicle key is activated or not, whether the vehicle is started or not, and whether the driver is seated or not.

The control part 500 may predict whether the driver will get out of the vehicle by comparing information detected by the driver get-out prediction condition detection part 612 with a preset condition.

The driver get-out prediction condition detection part 612 may detect whether the driver will get out of the vehicle.

For example, the driver get-out prediction condition detection part 612 may detect one or more of whether the vehicle is stopped or not, whether the vehicle has reached a destination or not, whether the door is unlocked or not, whether the vehicle key is activated or not, safety belt fastening state information, parking gear status information, parking brake operating state information, whether a parking mode is enabled or not, and vehicle deceleration state information.

The control part 500 may predict whether the driver will get out of the vehicle by comparing information detected by the driver get-out prediction condition detection part 612 with a preset condition.

Specifically, if the driver is expected to get into or get out of the vehicle, the control part 500 may actuate the actuating part 440 such that the first guide member 421 and the second guide member 422 move in a direction in which they get closer to the nut 320. At this time, the first auxiliary elastic member 431 and the second auxiliary elastic member 432 may be compressed, and the range of movement of the nut 320 may be decreased.

Alternatively, the steering apparatus 101 according to an embodiment of the present disclosure may further include a control part 500.

If a vehicle driving condition is inputted, the control part 500 may actuate the nut movement range adjusting part 400 such that the range of movement of the nut 320 is not restricted. Specifically, the control part 500 may determine that the vehicle will be driven, by receiving information from the vehicle driving condition detection part 620.

Based on the determination as to whether a vehicle driving condition has been inputted or not, the control part 500 may control the actuating part 440 so as to variably provide mechanical feedback with respect to the rotation of the steering column 200, thereby adjusting the range of movement of the nut 320.

For example, the vehicle driving condition detection part 620 may detect whether a driving condition needed for the driver to drive the vehicle is inputted or not. The vehicle driving condition detector 620 may detect one or more of whether the vehicle is started or not, gear status information required for driving, whether the parking brake is released or not, whether a destination is inputted or not, and whether a certain length of time has elapsed after making a prediction that the driver will get into the vehicle.

Moreover, the control part 500 according to an embodiment of the present disclosure may predict whether the driver will get into or get out of the vehicle and determine whether the vehicle will be driven.

That is, if the vehicle is driven, the control part 500 may cause the nut 320 to have a wider range of movement than it has when the driver is expected to get into or get out of the vehicle.

For example, once the vehicle is driven, the control part 500 may cause the first guide member 421 and the second guide member 422 to move past where the main lead screw 310 is formed, such that the nut 320 moves along the area where the main lead screw 310 is formed. At this time, the control part 500 may cause the first guide member 421 and the second guide member 422 to move to where they do not interfere with the movable range of the nut 320.

Alternatively, if the driver is expected to get out of the vehicle, the control part 500 may cause the nut 320 to have a narrower range of movement by moving the first guide member 421 and the second guide member 422 to where the main lead screw 310 is formed.

Moreover, the actuating part 440 requires power for rotating the supporting shaft 410 in order to adjust the movable range of the nut 320. That is, even a small-capacity actuating part 440 is able to effectively adjust the movable range of the nut 320.

Furthermore, the main elastic member 330 according to an embodiment of the present disclosure may include a first main elastic member 331 and a second main elastic member 332.

The first main elastic member 331 may be disposed on one side of the nut 320. Also, the first main elastic member 331 may be wound around the outside of the shaft of the steering column 200 and be compressed and form feedback when the nut 320 moves in one direction.

The second main elastic member 332 may be disposed on the other side of the nut 320. Also, the second main elastic member 332 may be wound around the outside of the shaft of the steering column 200 and be compressed and form feedback when the nut 320 moves in the other direction.

Furthermore, the housing 301 of the rotation restraint mechanism 300 according to an embodiment of the present disclosure may include a first restraint member 302 and a second restraint member 303.

The first restraint member 302 may be disposed inside the housing 301. Specifically, an inner periphery of the first restraint member 302 may rotatably support the steering column 200. Also, if the first main elastic member 331 is compressed as the nut 320 moves, the first restraint member 302 may support the first main elastic member 331 in such a way as to be compressively deformed.

For example, the first restraint member 302 may protrude from the inside of the housing 301 such that an inner portion thereof supports an outer periphery of the shaft of the steering column 200 and restricts the position of movement of the first main elastic member 331.

The second restraint member 303 may be disposed inside the housing 301. Specifically, an inner periphery of the second restraint member 303 may rotatably support the steering column 200. Also, if the second main elastic member 332 is compressed as the nut 320 moves, the second restraint member 303 may support the second main elastic member 332 in such a way as to be compressively deformed. And, the second restraint member 303 may be spaced apart from the first restraint member 302 along the length direction of the steering column 200.

For example, the second restraint member 303 may protrude from the inside of the housing 301 such that an inner portion thereof supports an outer periphery of the shaft of the steering column 200 and restricts the position of movement of the second main elastic member 332. Specifically, the first restraint member 302 and the second restraint member 303 may protrude toward the inside of the housing 301 in opposite directions.

Furthermore, the rotation restraint mechanism 300 of the steering apparatus 101 according to an embodiment of the present disclosure may further include a guiding portion 340.

The guiding portion 340 may be disposed within the housing 301 in parallel with the length direction of the steering column 200. Also, the guiding portion 340 may guide the linear movement of the nut 320 which is to be coupled to the main lead screw 310. And, the guiding portion 340 may be coupled to the nut 320 and guide the nut 320 to move along the length direction of the steering column 200 when it moves along the main lead screw 310 which engages the thread formed on an inner periphery of the nut 320.

For example, the guiding portion 340 may be formed like a bar or a rail.

Moreover, the steering apparatus 101 according to an embodiment of the present disclosure may further include an angle sensor 900, a decelerator 800, and a feedback actuator 700, as illustrated in FIG. 1.

The angle sensor 900 may detect an angle of rotation of the steering column 200 and transfer it to the control part 500.

The decelerator 800 and the feedback actuator 700 provide feedback of rotation of the steering wheel 100. Specifically, the decelerator 800 and the feedback actuator 700 may provide feedback so that the driver gets a steering feel in maneuvers of the vehicle wheels which are connected by an electrical signal along with the steering wheel 100 of the steer-by-wire steering apparatus 101 manipulated by the driver.

That is, the decelerator 800 and the feedback actuator 700 may provide feedback so as to give the driver the feeling of how the wheels of the vehicle are steered when they are not mechanically connected to the steering wheel 100.

The feedback actuator 700 may control the operation of the decelerator 800. The control part 500 may control the feedback actuator 700 to actuate the decelerator 800 so that the driver gets a steering feel from the vehicle wheels connected by an electrical signal as the steering wheel 100 is turned.

For example, the control part 500 may control the feedback actuator 700 by taking the vehicle's speed or the like into account so that the driver gets a different feel from the vehicle wheels connected by an electrical signal as the steering wheel 100 is turned. That is, the feedback actuator 700 and the decelerator 800 may make the driver have a heavier steering feel when driving the vehicle at high speeds than at low speeds. Alternatively, provided that the steering wheel 100 is turned by the same amount, the feedback actuator 700 and the decelerator 800 may control the actual steering angle of the vehicle wheels to be smaller when the driver is driving the vehicle at high speeds compared to when driving the vehicle at low speeds.

Moreover, the rotation restraint mechanism 300 according to an embodiment of the present disclosure may be supported on the steering column 200 under the decelerator 800.

The rotation restraint mechanism 300 may provide mechanical feedback so as to restrict the rotation of the steering column 200 caused by the steering wheel 100, even when no power is supplied to the feedback actuator 700.

In addition, the actuating part 440 according to an embodiment of the present disclosure may be configured to have a smaller actuating force than the feedback actuator 700, and is able to effectively adjust the movable range of the nut 320. That is, the actuating part 440 may be operated with less electrical power than the feedback actuator 700 which actuates the decelerator 800.

Hereinafter, an operation process of the steering apparatus 101 according to an embodiment of the present disclosure will be described with reference to FIGS. 1 to 6.

The control part 500 determines whether the driver is expected to get into or get out of the vehicle (S110).

If the driver is expected to get into or get out of the vehicle, the control part 500 actuates the actuating part 440 (S120). Specifically, the control part 500 causes the first guide member 421 and the second guide member 422 to move toward the nut 320 (S130), as illustrated in FIG. 4. Also, the control part 500 causes the first guide member 421 and the second guide member 422 to move in a direction in which the first auxiliary elastic member 431 and the second auxiliary elastic member 432 are compressed.

Accordingly, if the driver is expected to get into or get out of the vehicle, the movable range of the nut 320 may be reduced. That is, if the driver is expected to get into or get out of the vehicle, the area in which the nut 320 can be moved along the length direction of the steering column 200 may be reduced, and, thereby, the rotation of the steering column 200 may be restricted even when the steering wheel 100 is turned by a small amount.

At this time, mechanical feedback is provided by the first auxiliary elastic member 431 and the second auxiliary elastic member as the steering wheel 100 is turned, so the steering column 200 may stop rotating even with a steering force exerted by the driver.

Alternatively, if the driver is not expected to get into or get out of the vehicle, the control part 500 may determine whether a vehicle driving condition has been inputted or not (S210).

As illustrated in FIG. 2, if it is determined that a vehicle driving condition has been inputted, the control part 500 actuates the actuating part 440 (S220). Specifically, the control part 500 causes the first guide member 421 and the second guide member 422 to move away from the nut 320 (S230). Also, the control part 500 causes the first guide member 421 and the second guide member 422 to move in a direction in which the first auxiliary elastic member 431 and the second auxiliary elastic member 422 are decompressed. And, the control part 422 may actuate the actuating part 440 to move the first guide member 421 and the second guide member 422 in a direction in which they get closer to opposite ends of the housing 301 so that they move away from the area where the main lead screw 310 is formed.

At this time, if the driver manipulates the steering wheel 100, the nut 320 may have a wider range of movement along the steering column 200 than it has when the driver is expected to get into or get out of the vehicle. That is, once it is determined that a vehicle driving condition has been inputted, the range of rotation of the steering column 200 caused by the steering wheel 100 may be shifted depending on the area where the main lead screw 310 is formed to allow movement of the nut 320.

That is, the steering apparatus 101 may predict whether the driver will get into or get out of the vehicle, and if the driver is expected to get into or get out of the vehicle, may restrict the range of rotation of the steering column 200, thereby preventing the driver from getting injured due to idling of the steering wheel.

If it is determined that a vehicle driving condition has been inputted, mechanical feedback may be generated from the nut 320 as the main elastic member 330 is compressively deformed by the nut 320.

With this construction, the steering apparatus 101 according to an embodiment of the present disclosure may restrict the rotation of the steering column 200 by providing mechanical feedback as the steering column 200 rotates.

If the driver is expected to get out of the vehicle, the steering apparatus 101 may reduce the movable range of the nut 320 by causing the first guide member 421 and the second guide member 422 to move toward the nut 320. That is, even if the driver turns the steering wheel 100 with a great steering force when the vehicle is not started, the first auxiliary elastic member 431 and the second auxiliary elastic member 432 may stop the rotation of the steering column 200 by providing feedback, without it being turned by a large amount.

Accordingly, the steering apparatus 101 is able to prevent the driver from getting injured due to rotation of the steering wheel as the driver gets in or out of the vehicle while holding the steering wheel when the vehicle is not started. That is, the steering apparatus 101 is able to prevent accidents caused by idling of the steering wheel as the driver gets in or out of the vehicle while holding the steering wheel when the vehicle is not started.

If the driver is expected to get out of the vehicle, the steering apparatus 101 may reduce the movable range of the nut 320, thereby effectively solving the problem of having to constantly supply power for adjusting the movement of the nut 320. That is, as stated above, the rotation restraint mechanism 300 is controlled in such a way as to reduce the movable range of the nut 320 when the driver gets out of the vehicle, thus effectively restricting the rotation of the steering column 200 without electric power supplied to the actuating part 440 when the driver gets into the vehicle.

Moreover, the steering apparatus 101 is able to provide mechanical feedback as the main elastic member 330 or the auxiliary elastic member 430 is compressed, thereby reducing noise and improving the lifetime of the nut 320 compared to when the nut 320 hits directly against other components.

That is, if the driver is expected to get into or get out of the vehicle when the vehicle is not started, the steering apparatus 101 according to an embodiment of the present disclosure may restrict the range of rotation of the steering column through mechanical feedback, thereby effectively preventing the driver from getting injured due to idling of the steering wheel when the driver gets in or out of the vehicle while holding the steering wheel.

Although the embodiments of the present disclosure have been described above with reference to the accompanying drawings, those of ordinary skill in the art to which the present disclosure pertains will be understand that the present disclosure may be embodied in other specific forms without changing the technical spirit or essential characteristics thereof.

Therefore, the embodiments described above are to be understood as illustrative and not restrictive in all respects, and the scope of the present disclosure is indicated by the following claims, the meaning and scope of the claims, and all changes or modifications derived from the equivalent concept should be construed as being included in the scope of the present disclosure.

What is claimed is:

1. A steering apparatus including a steering wheel which is manipulated by a driver of a vehicle and a steering column which is turned by the steering wheel, the steering apparatus comprising a rotation restraint mechanism which is able to restrict the rotation of the steering column by providing mechanical feedback to the steering column,
   wherein
   the rotation restraint mechanism includes a nut and a nut movement range adjusting part capable of adjusting a range of movement of the nut, and
   the nut movement range adjusting part includes:
   a supporting shaft spaced apart from the steering column;
   an adjusting guide supported on the supporting shaft and being movable toward the nut; and
   an actuating part that provides power so as to move the adjusting guide.

2. The steering apparatus of claim 1, wherein
   the rotation restraint mechanism further includes:
   a main lead screw formed in one region of the steering column; and
   a main elastic member that forms feedback when the nut moves, and
   the nut is movable along the main lead screw.

3. The steering apparatus of claim 1, wherein the adjusting guide includes:
   a first guide member supported on the supporting shaft and disposed on one side of the nut; and a second guide member supported on the supporting shaft and disposed on the other side of the nut.

4. The steering apparatus of claim 3, wherein the nut movement range adjusting part includes:
a first auxiliary elastic member disposed between one side of the nut and the first guide member; and
a second auxiliary elastic member disposed between the other side of the nut and the second guide member.

5. The steering apparatus of claim 1, further comprising a control part that, if the driver is expected to get into or get out of the vehicle, actuates the nut movement range adjusting part so as to restrict the range of movement of the nut.

6. The steering apparatus of claim 1, further comprising a control part that, if a vehicle driving condition is inputted, actuates the nut movement range adjusting part such that the range of movement of the nut is not restricted.

7. The steering apparatus of claim 3, further comprising a control part that, if the driver is expected to get into or get out of the vehicle, actuates the actuating part such that the first guide member and the second guide member move in a direction toward each other.

8. A steering apparatus including a steering wheel which is manipulated by a driver of a vehicle and a steering column which is turned by the steering wheel, the steering apparatus comprising a rotation restraint mechanism which, based on whether a vehicle driving condition is inputted or not, is able to restrict the rotation of the steering column by providing mechanical feedback with respect to the rotation of the steering column as the steering wheel is turned,
wherein the rotation restraint mechanism includes:
a main lead screw formed in one region of the steering column;
a nut that is movable along the main lead screw;
a first main elastic member which forms feedback when the nut moves in one direction;
a second main elastic member which forms feedback when the nut moves in the other direction;
a first restraint member spaced apart from the nut, with the first main elastic member in between, for restricting the position of the first main elastic member; and
a second restraint member spaced apart from the nut, with the second main elastic member in between, for restricting the position of the second main elastic member.

9. The steering apparatus of claim 8, wherein the rotation restraint mechanism includes:
a first guide member configured to move toward the nut and capable of adjusting the range of movement of the nut; and
a second guide member spaced apart from the first guide member, with the nut in between, configured to be movable toward the nut, and capable of adjusting the range of movement of the nut.

10. The steering apparatus of claim 9, wherein the rotation restraint mechanism further includes:
a first auxiliary elastic member which is compressed and forms feedback as the first guide member moves toward the nut; and
a second auxiliary elastic member which is compressed and forms feedback as the second guide member moves toward the nut.

11. The steering apparatus of claim 10, wherein, if a vehicle driving condition is inputted, the rotation restraint mechanism causes the first guide member and the second guide member to move in a direction away from the nut.

12. The steering apparatus of claim 10, wherein, when the first guide member and the second guide member move in a direction away from the nut, the first guide member and the second guide member move outside the area where the main lead screw is formed.

13. A steering apparatus including a steering wheel which is manipulated by a driver of a vehicle and a steering column which is turned by the steering wheel, the steering apparatus comprising a rotation restraint mechanism which, if the driver is expected to get out of the vehicle, is able to restrict the rotation of the steering column by providing a larger amount of mechanical feedback with respect to the rotation of the steering column as the steering wheel is turned, compared to when the vehicle is driving.

14. The steering apparatus of claim 13, wherein the rotation restraint mechanism includes:
a main lead screw formed in one region of the steering column;
a nut that is movable along the main lead screw;
a main elastic member that, if the vehicle is driving, forms feedback when the nut moves;
an adjusting guide that is movable along the supporting shaft; and
an auxiliary elastic member that, if the driver is expected to get into or get out of the vehicle, forms feedback when the nut moves.

15. The steering apparatus of claim 14, wherein, if the driver is expected to get out of the vehicle, the auxiliary elastic member is compressed to a large extent compared to the main elastic member.

16. The steering apparatus of claim 14, wherein, if the driver is expected to get out of the vehicle, the area in which the nut is movable on the main lead screw is small compared to when the vehicle is driving.

17. The steering apparatus of claim 14, wherein one side of the adjusting guide is supported on the supporting shaft, and the other side of the adjusting guide is configured to extend toward the steering column.

* * * * *